US008498845B2

(12) United States Patent
Jing et al.

(10) Patent No.: US 8,498,845 B2
(45) Date of Patent: Jul. 30, 2013

(54) METHOD FOR GEOPHYSICAL IMAGING

(75) Inventors: Charlie Jing, Houston, TX (US);
Dennis E. Willen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 261 days.

(21) Appl. No.: 13/018,711

(22) Filed: Feb. 1, 2011

(65) Prior Publication Data
US 2011/0264421 A1  Oct. 27, 2011

Related U.S. Application Data

(60) Provisional application No. 61/326,456, filed on Apr. 21, 2010.

(51) Int. Cl.
G06F 7/60 (2006.01)
G06F 17/10 (2006.01)

(52) U.S. Cl.
USPC ............................................. 703/2; 703/10

(58) Field of Classification Search
USPC .................. 703/9–10; 702/6–13, 45–56, 100
See application file for complete search history.

(56) References Cited

U.S. PATENT DOCUMENTS

| | | | |
|---|---|---|---|
| 5,543,714 | A | 8/1996 | Blanpain et al. |
| 6,523,015 | B1 | 2/2003 | Bera et al. |
| 6,944,546 | B2 | 9/2005 | Xiao et al. |
| 6,999,880 | B2 | 2/2006 | Lee |
| 7,072,767 | B2 | 7/2006 | Routh et al. |
| 7,126,338 | B2 | 10/2006 | MacGregor et al. |
| 7,356,412 | B2 | 4/2008 | Tompkins |
| 7,502,690 | B2 | 3/2009 | Thomsen et al. |
| 8,014,988 | B2 * | 9/2011 | Wahrmund et al. ............. 703/10 |

(Continued)

FOREIGN PATENT DOCUMENTS

WO  WO 2008/013613  1/2008

OTHER PUBLICATIONS

Direct reservoir parameter estimation using joint inversion of seismic AVO & marine CSEM data, G. Michael Hoversten, Forence Cassassuce, Gregory A. Newman, Lawrence Berkeley National Laboratory, SEG Int'l Exposition and 74th Annual Meeting, Oct. 10-15, 2004.*

(Continued)

Primary Examiner — Matt Kim
Assistant Examiner — Maryam Ipakchi
(74) Attorney, Agent, or Firm — ExxonMobil Upstream Research Company Law Dept.

(57) ABSTRACT

Method for transforming electromagnetic survey data acquired from a subsurface region to a subsurface resistivity model indicative of hydrocarbon accumulations or lack thereof. In one embodiment, data are selected for two or more non-zero frequencies (100), and a structural model of the region is developed based on available geological or geophysical information. An initial resistivity model of the region is developed based on the structural model (101), and the selected data are inverted to update the resistivity model (106) by iterative forward modeling (103) and minimizing an objective function (105) including a term measuring mismatch between model synthesized data and measured survey data, and another term being a diffusive regularization term that smoothes the resistivity model (104). The regularization term can involve a structure or geology constraint, such as an anisotropic resistivity symmetry axis or a structure axis, determined from the a priori information (102).

15 Claims, 5 Drawing Sheets
(4 of 5 Drawing Sheet(s) Filed in Color)

U.S. PATENT DOCUMENTS

| | | | |
|---|---|---|---|
| 8,121,823 B2 * | 2/2012 | Krebs et al. | 703/10 |
| 8,239,181 B2 * | 8/2012 | Lu et al. | 703/10 |
| 8,265,913 B2 * | 9/2012 | MacGregor et al. | 703/10 |
| 2007/0265782 A1 | 11/2007 | Kleinberg et al. | |
| 2009/0306900 A1 * | 12/2009 | Jing et al. | 702/13 |
| 2010/0018719 A1 * | 1/2010 | Lu et al. | 166/369 |
| 2010/0198638 A1 * | 8/2010 | Deffenbaugh et al. | 705/7 |
| 2010/0326669 A1 * | 12/2010 | Zhu et al. | 166/369 |
| 2011/0166840 A1 * | 7/2011 | Green et al. | 703/2 |
| 2011/0255371 A1 * | 10/2011 | Jing et al. | 367/73 |

OTHER PUBLICATIONS

Archie, G.E. (1942), "The electrical resistivity log as an aid in determining some reservoir characteristics," *Transactions of the AIME* 146, pp. 54-62.

Blaschek, R. et al. (2008), "A new sensitivity-controlled focusing regularization scheme for the inversion of induced polarization data based on the minimum gradient support," *Geophysics* 73, pp. F45-F54.

Carazzone, J.J. (2005), "Three Dimensional Imaging of Marine CSEM Data, Expanded Abstracts" 75th Annual International meeting, Society of Exploration Geophysics, pp. 575-578.

Chen, J. et al. (2007), "Effects of uncertainty in rock-physics models on reservoir parameter estimation using marine seismic AVA and CSEM data," Abstracts of the 77$^{th}$ Annual International Meeting, Society of Exploration Geophysicists, pp. 457-461.

Commer, M. (2008), "New advances in three-dimensional controlled-source electromagnetic inversion," *Geophys. J. Int.* 172, pp. 513-535.

Constable, S. (1987), "Occam's inversion: a practical algorithm for generating smooth models from electromagnetic sounding data," *Geophysics* 52, pp. 289-300.

Dorn, O. et al. (2002), "Sensitivity analysis of a nonlinear inversion method for 3D electromagnetic imaging in anisotropic media," *Inverse Problems* 18, pp. 285-317.

Ellingsrud, S. (2002), "Remote sensing of hydrocarbon layers using seabed logging (SBL): Results of a cruise offshore Angola," *The Leading Edge* 21, 972-982.

Gallardo, L.A. et al. (2004), "Joint two-dimensional DC resistivity and seismic travel time inversion with cross-gradients constraints," *J. of Geophysical Research* 109, 11 pgs.

Gallardo, L.A. (2005), A quadratic programming approach for joint image reconstruction: mathematical and geophysical examples, *Inverse Problems* 21, pp. 435-452.

Herwanger, J.V. (2002), "Electric and Seismic Inversion in Anisotropic Inhomogeneous Media," 4th Int'l. Conf. on Inverse Problems in Engineering, 8 pgs.

Hou, Z. et al. (2006), Reservoir-parameter identification using minimum relative entropy-based Bayesian inversion of seismic AVA and marine CSEM data, *Geophysics* 716(6), pp. O77-O88.

Hoversten, G.M. et al. (2006), "Direct reservoir parameter estimation using joint inversion of marine seismic AVA and CSEM data," *Geophysics* 71(3), pp. C1-C13.

Hu, W. et al. (2007), "Joint inversion algorithm for electromatic and seismic data," Abstracts of the 77$^{th}$ Annual Int'l. Meeting, Society of Exploration Geophysicists, pp. 1745-1749.

Jupp, D. et al. (1977), "Resolving anisotrophy in layered media by joint inversion," *Geophysical Prospecting* 25, pp. 460-470.

Kaipio, J.P. et al. (1999), "Inverse problems with structural prior information," *Inverse Problems* 15, pp. 713-729.

Landa, E. et al. (1989), "Reference velocity model estimation from prestack waveforms: coherency optimization by simulated annealing," *Geophysics* 54(8), pp. 984-990.

Lovatini, A. et al. (2009), "3D CSEM inversion in a frontier basin offshore west Greenland," *First Break* 27, pp. 95-98.

Lu, X. et al. (2007), Understanding anisotropy in marine CSEM data, 77th Annual Int'l. Meeting, Society of Exploration Geophysicists, Expanded Abstracts, pp. 633-637.

Mora, P., "Nonlinear two-dimensional elastic inversion of multioffset seismic data," *Geophysics* 52(9), pp. 1211-1228, 1987.

Newman, G.A. et al. (1997), "Three-dimensional massively parallel electromagnetic inversion—I. Theory," *Geophys. J. Int.* 128, pp. 345-354.

Newman, G.A. et al. (2000), Three-dimensional magnetotelluric inversion using non-linear conjugate gradients, *Geophys. J. Int.* 140, pp. 410-424.

Pain, C.C. (2003), "Anisotropic Resistivity Inversion,"*Inverse Problems* 19, pp. 1081-1111.

Portniaguine, O., et al. (1999), "Focusing geophysical inversion images," *Geophysics* 64(3), pp. 874-887.

Saunders, J. et al. (2005), Constrained resistivity inversion using seismic data, *Geophys. J. Int.* 160, pp. 785-796.

Srnka, L.J. et al. (2006), "Remote reservoir resistivity mapping—an overview," *The Leading Edge* 25, pp. 972-975.

Stoffa, P. et al. (1991), "Nonlinear multiparameter optimization using genetic algorithms: Inversion of plane-wave seismograms," *Geophysics* 56(11), pp. 1794-1810.

Symes, W.W. et al. (1991), "Velocity Inversion by differential semblance optimization," *Geophysics* 56(5), pp. 654-663.

Xu, S. et al. (1995), "A new velocity model for clay-sand mixtures," *Geophysical Prospecting* 43, pp. 91-118.

\* cited by examiner

METHOD FOR GEOPHYSICAL IMAGING

CROSS-REFERENCE TO RELATED APPLICATION

This application claims the benefit of U.S. provisional patent application 61/326,456 filed Apr. 21, 2010 entitled METHOD FOR GEOPHYSICAL IMAGING, the entirety of which is incorporated by reference herein.

FIELD OF THE INVENTION

This invention relates generally to the field of geophysical prospecting and, more particularly, to inversion of electromagnetic survey data to obtain a resistivity model of the subsurface. Specifically, the invention is a method for inverting electromagnetic geophysical data to produce a subsurface resistivity model that is consistent with at least one other subsurface image or model derived from other geological or geophysical information, such as geology structure interpretation, seismic velocity fields, and seismic images. Such resistivity images are generally useful for predicting rock properties and for inferring the presence or absence of hydrocarbons in the subsurface.

BACKGROUND OF THE INVENTION

The earth's electromagnetic response is commonly measured both offshore and on land in an effort to identify possible areas of hydrocarbon accumulation. Controlled-source and/or magnetotelluric data are used to derive a resistivity model of the subsurface, (Ellingsrud et al., 2002; Srnka et al., 2006) which is used to identify the potential areas of hydrocarbon accumulation in the subsurface. Such subsurface models can be equivalently described in terms of their conductivities.

Measured electromagnetic data have a complicated, non-linear dependence on the subsurface resistivity. Subsurface resistivities are typically derived from electromagnetic data by iterating a linearized inversion designed to minimize an objective function that characterizes the error or misfit between acquired and synthesized data (Newman and Alumbaugh, 1997 and Carazzone et al., 2005). So, in FIG. 1, a typical objective function might be $$\phi = \frac{1}{2}\sum_i \left(W_i(d_i^{meas} - d_i^{synth}(\vec{m}))\right)^T \left(W_i(d_i^{meas} - d_i^{synth}(\vec{m}))\right) + \frac{1}{2}\lambda F^T(\vec{m})F(\vec{m}) \quad (1)$$

Here, the $d_i$ are measured or synthetic electromagnetic field values and the sum is over all data, i, including locations, vector components, and frequencies. The $W_i$ are data weights chosen to compensate the data for varying magnitudes and uncertainties and $\vec{m}$ is the vector of unknown subsurface parameters such as conductivity, log conductivity, or resistivity. The vector, $\vec{m}$, may further include certain unknown or poorly-determined parameters of the survey, such as the orientation of receiver antennae on the seafloor. The superscript T represents the matrix transpose. The function, F, is chosen to steer the inversion toward an a priori notion of the subsurface parameters. The trade-off parameter, $\lambda$, controls the relative strength of the data mismatch and a priori terms and is typically reduced as the data mismatch decreases during the inversion. As shall be seen below, it is possible to introduce additional terms into equation (1), with additional trade-off parameters, $\lambda_i$, to encourage the inversion toward models that match several a priori criteria.

The data mismatch term in the objective function of equation (1) is usually made quadratic in $\vec{m}$ by assuming that the model change from one update in an iterative inversion process is small. To make the total objective function, $\phi$, quadratic in $\vec{m}$ and thereby simplify the least-squares minimization, the regularization function F is typically chosen to be linear in $\vec{m}$. A linear regularization function can be expressed in matrix notation as, $$F(\vec{m}) = C \cdot \vec{m} \quad (2)$$

The matrix C represents the linear operation of the regularization on the inversion parameters, $\vec{m}$.

The trade-off parameter, $\lambda$, controls the relative strength of the a priori term and the data mismatch and is typically reduced as the data mismatch decreases during the inversion. $\lambda$ will most typically be adjusted during the inversion iterations so that the regularization term in the objective function is about one order of magnitude smaller than the data mismatch term and preferably between ⅕th and 1/100th of the data mismatch term.

The efficient implementation of a nonlinear conjugate gradient method on massively-parallel computers and, in particular, the separation of the grids used to compute the electromagnetic fields from the grids used to represent the subsurface model have been discussed by Commer and Newman (2008) and by Newman and Alumbaugh (1997, 2000). In addition to the conjugate gradient technique, various other inversion methods have been used by geophysicists to invert either electromagnetic or seismic data. Such methods include differential semblance optimization (Symes and Carazzone, 1991), genetic algorithms, (Stoffa and Sen, 1991), simulated annealing, (Landa, et al, 1989), maximum smoothness (Constable, et al, 1987), and Gauss-Newton (Hu et al., 2007).

Non-uniqueness is a feature common to most geophysical data inversions. This is especially true for controlled source electromagnetic ("CSEM") inversion given the exponential decay of the data, the low frequencies involved, and the limited data coverage. The regularization term in equation (1) is used to mitigate the non-uniqueness in the solution. For the case of linear regularization function, the operator C in equation (2) is normally set to be either first-order or second-order spatial derivatives (Newman and Alumbaugh (1997, 2000); Constable, et al, 1987), which leads to a spatially smooth solution. If, instead, the term is implemented as, $$F(\vec{m})C_0 \cdot (\vec{m} - \vec{m}) \quad (3),$$

where $C_0$ is a diagonal matrix and $\vec{m}_0$ is an a priori estimate of the model parameters, then the inversion will be prejudiced toward models that are in the neighborhood of the a priori estimate $\vec{m}_0$.

Non-linear regularizations have also been used in geophysical inversion. One such example is (Portniaguine, 1999; Blaschek, 2008), $$F^T(\vec{m})F(\vec{m}) = \frac{(\nabla \vec{m})^T(\Delta \vec{m})}{(\nabla \vec{m})^T(\Delta \vec{m}) + \beta^2}. \quad (4)$$

This regularization is designed to seek solutions with a minimum number of sharp boundaries by adjusting the value of parameter $\beta$.

Even with these different types of regularization, the resistivity images from CSEM data inversions generally still lack structural consistency with subsurface structure derived from other sources, such as seismic data. While the electrical and elastic properties of the earth may differ in detail at the reservoir scale, they will generally be correlated over larger distances since they arise from the same subsurface region, depositional processes, source rocks, and pore fluids. This structure inconsistency makes geological interpretation difficult and the prediction of hydrocarbon presence less reliable.

Another important aspect of subsurface imaging is rock physical property anisotropy. The subsurface resistivity may be anisotropic. That is, the electrical resistivity of the earth may depend on the direction of current flow (Lu and Xia, 2007; Jupp and Vozoff, 1997). Likewise, seismic data are also acquired and imaged to form a model of the earth's elastic properties, which may also be anisotropic. Since the subsurface rock properties are both anisotropic and inhomogeneous over the distances probed by geophysical data, it is often difficult to unravel intrinsic from structurally-induced anisotropy. The intrinsic rock-property anisotropy represents the anisotropy of the rock itself, which exists normally at micro scale much smaller than that probed by seismic or CSEM data. A typical example is anisotropy due to the microscopic, plate-like structures in shales and other clay-rich minerals. This intrinsic rock anisotropy may and may not show up at large scale depending how the rock fine grains are aligned in space. So, shales deposited gently in large sedimentary beds over long periods of time may manifest their intrinsic anisotropy in electromagnetic data while sand deposited in a more rapid and chaotic fashion may appear isotropic in electromagnetic data. Structurally-induced anisotropy represents the effective anisotropy at the scale probed by a particular geophysical data type due to the rock property variation in space within the probed scale. Normally, the subsurface shows structurally-induced anisotropy at the probing scale due to the inhomogeneous rock property at the subsurface even the rocks are intrinsically isotropic at fine scale. Thus, alternating beds of sandstone and limestone, while intrinsically isotropic, may manifest themselves as an anisotropic composite in electromagnetic data. While the symmetry axes of the electrical properties may be oriented differently than those of the elastic properties, these orientations are intrinsically correlated. In principle, the full anisotropic resistivity, including both the orientations of the symmetry axes and the principle resistivities (resistivities along the symmetry axes) can be treated as unknown parameters in an anisotropic inversion (Pain, et al, 2003). Such straightforward electrical inversion can fail to predict the orientations of the symmetry axes (even on synthetic data from a simple model) when the orientations vary in space (Pain, et al, 2003). It is difficult to derive reliable orientations of symmetry axes and principle resistivities from the measured CSEM data in geological settings encountered in hydrocarbon exploration, and it is even more difficult to correlate the derived orientations to that from other sources, such as seismic data.

In any event, the problems of inverting CSEM data to a resistivity model that is consistent with the subsurface structure derived from other sources, such as seismic data, can not be achieved by those common regularizations without utilizing the a priori structure information.

In order to understand the differences in detail and to render a useful geological interpretation from the resistivity and elastic models, it is very valuable to have methods that will invert CSEM data in a way that is globally consistent with seismic or other geophysical measurements, and distinguish the intrinsic subsurface anisotropy from the effects of geological structures and inhomogeneity.

One direct solution that has been proposed for obtaining a resistivity image consistent with another property, such as the seismic velocity, is to link the electrical rock property directly to said other property (such as elastic properties) by using some relationships (Archie, 1942; Xu and White, 1995), and to perform joint inversion of the CSEM data and geophysical data that measure said other property. For the case of joint electromagnetic and seismic inversion (Hoversten, et al 2006), the inversion parameter vector, $\vec{m}$, includes parameters from which both resistivities and subsurface elastic properties such as the density and seismic velocities can be derived by using known relationships. The data vectors for joint inversion, $d_i$, include both electromagnetic field measurements and seismic measurements such as pressure, velocity, or acceleration. The objective function measures both the misfit between synthetic and measured electromagnetic data as well as the misfit between synthetic and measured seismic data; and, the function F in equation (1) is chosen to enforce the smoothness requirements by means of a simple, first-order gradient of the parameters. As the electrical and elastic properties of the subsurface are updated to reduce the sum of the data misfit and model smoothness terms, the updated parameters are additionally constrained to satisfy rock-physics relationships. One example of these additional constraints would be to require that the electrical and elastic properties be derivable from unique values for porosity, water saturation, and shale volume. The seismic and resistivity images are thereby linked by the rock physics relationships during this type of inversion.

Due to the complexity of the subsurface rock, it is very challenging to build rock physics relationships that work for the wide variety of rock mixtures. Chen and Dickens (Chen and Dickens, 2007) have shown that errors in the rock physics relationships have a big impact on the reliability of the inversion results. Moreover, different geophysical data types respond to changes in subsurface properties over very different length scales, making it ambiguous how the properties should be averaged into the rock-property relationships. These errors and complexities make the practical application of this direct method of joint inversion difficult.

The standard method (see, for example, A. Lovatini, K. Umbach, and S. Patmore, "3D CSEM inversion in a frontier basin offshore west Greenland," *First Break* 27, 95-98 (2009)) for inverting electromagnetic data to resistivity images that are consistent with models of other rock properties (such as a seismic reflectivity image, seismic velocity, gravity model, magnetic model, or well logs) is to begin the electromagnetic data inversion with a resistivity model that is already at least structurally consistent with the non-electromagnetic data. The inversion usually breaks this consistency due to the discrepancy between the starting model and the actual subsurface resistivity, limited data coverage, resolution, and non-uniqueness. The inversion result is then re-interpreted and modified in light of the seismic images. The modified resistivity model then serves as the starting model for a subsequent inversion. If successful, the method converges to a resistivity model that is consistent with both the seismic image and the electromagnetic data. This method is both labor-intensive and computationally inefficient. It becomes impractical or can fail to converge to the correct answer when more than two types of data are included.

In an alternate approach to the rock-physics-relationship based joint inversion, Gallardo et al. (2004, 2005) introduced the joint inversion of zero-frequency (i.e., direct current) electrical measurements and seismic refraction travel time measurements with cross-gradient constraints. In addition to the usual regularization (smoothing) terms, the side condition or cross-gradient constraint, $$\nabla \vec{m}_e \times \nabla \vec{m}_s = 0 \qquad (5)$$

is applied to the electrical parameter vector $\vec{m}_e$ and the seismic parameter vector $\vec{m}_s$. This cross-product condition is designed to ensure the geometrical similarity between the inverted results of $\vec{m}_e$ and $\vec{m}_s$.

As a refinement to the method of Gallardo et al., Hu et al. (2007) separate the joint inversion of electric and seismic data into cyclic seismic and electromagnetic inversion steps. After the electromagnetic parameters have been updated, the seismic parameters are inverted and updated, followed by an inversion and update of the electromagnetic parameters and so on. Each inversion is based on an objective function which includes a cross-gradient-type a priori term from the parameters corresponding to other data type $$\phi_e = \frac{1}{2}\sum_i \left(W_i\left(d_i^{meas} - d_i^{synth}(\vec{m}_e)\right)\right)^2 + \qquad (6a)$$
$$\frac{1}{2}\lambda_1 [C \cdot (\vec{m}_e - \vec{m}_{e,0})]^2 + \lambda_2 |\nabla \vec{m}_e \times \nabla \vec{m}_s|^2$$

$$\phi_s = \frac{1}{2}\sum_i \left(W_i\left(d_i^{meas} - d_i^{synth}(\vec{m}_s)\right)\right)^2 + \qquad (6b)$$
$$\frac{1}{2}\lambda_1 [C \cdot (\vec{m}_s - \vec{m}_{s,0})]^2 + \lambda_2 |\nabla \vec{m}_s \times \nabla \vec{m}_e|^2.$$

This approach allows Hu et al. to apply the more sophisticated Gauss-Newton method (Hu et al., 2007) separately for each data type, updating the electrical (or seismic) parameters in the seismic (or electrical) objective function after each iteration of the electrical (or seismic) inversion.

In practical application, it is very difficult for the two images to converge to the same structure due to factors such as the limited data coverage, rapid decay of the electric fields, subsurface anisotropy, unknown orientations of symmetry axes, and errors in the initial electrical and seismic models. These factors can lead to model gradients that are very poorly behaved (poorly correlated with the seismic data) during the iterations. Also, the subsurface anisotropy, which is important for the inversion of electromagnetic data, is not addressed by this cross-gradient method.

Along the line of adding structure information in the objective function, a method of seismically-constrained resistivity inversion has been introduced by Saunders et al, (Saunders et al, 2005) for the inversion of zero-frequency (i.e., direct current (DC)) electrical measurements. This work follows earlier publications on zero-frequency (DC) resistivity inversion (Kaipio et al, 1999; Herwanger et al, 2002; Pain et al, 2003). The a priori structure is derived from a known seismic velocity field and is incorporated into a constraint term in the objective function in the form of $$\tfrac{1}{2}(\nabla \vec{m}^T)\bar{K}(\nabla \vec{m}) \qquad (7)$$

The idea is to apply small or weak regularization in the direction and area where there is large curvature in the structure field, thus permitting larger changes to the electrical properties. The symmetric tensor $\bar{K}$ in equation (7) is obtained from the curvature of the known structure field, such as a seismic velocity field. More specifically, $\bar{K}$, is constructed from the eigenvalues and eigenvectors of the normalized Hessian of the known structure field, which, in turn, involves all the second-order spatial derivatives of the structure field.

The methods of Saunders et al, Paipio et al, Herwanger et al, and Pain et al focus on zero-frequency (i.e., direct current) electrical measurements. The full anisotropic resistivity, (including both the principle resistivity values and the orientations of the symmetry axes) were assumed to be derivable from the inversion of DC electrical measurements, and orientations of the symmetry axes were assumed to follow the same known structure. These authors, moreover, specifically add a regularization term to penalize the intrinsic anisotropy of the unknown material, apparently on the theory that allowing the intrinsic resistivities to vary freely can result in erroneous solutions and that the most realistic solutions are those with the smallest anisotropy. Based on the present inventors' experience with both surface electromagnetic and well-log data, this approach is rejected, and a term to penalize the intrinsic anisotropy is not added in the present invention.

Since the subsurface rock properties are both anisotropic and inhomogeneous over the distances probed by geophysical data, it is often difficult to unravel intrinsic anisotropy (a property of the rocks) from structurally-induced anisotropy (an aggregate property of rocks). Even though the orientations of the symmetry axes of electrical properties may be intrinsically correlated to those of the elastic properties, they may differ when averaged over the length scales appropriate to different geophysical data types. For example, the intrinsic anisotropy of shale beds may have been tilted relative to the horizontal during lithification, so that they manifest tilted anisotropy when measured by well-logging tools in a vertical wellbore. Meanwhile, adjacent sand beds would likely be isotropic. Surface electromagnetic data, operating at longer wavelengths than well logs, will sense a mixture of the tilted intrinsic anisotropy from the shales and a structural anisotropy from the interbedding of shales and sands. Simply forcing both the resistivities and orientations of the electrical symmetry axes to follow the same a priori structure during CSEM inversion may not generate geologically-consistent and reliable orientations of the electrical symmetry axes. The error in symmetry axis orientations will translate to error in the resistivity images, which can impact the interpretation of the subsurface. The non-uniqueness problem exists in most geophysical data inversions, and is especially true for CSEM data due to the low resolution and exponential decay of the fields. All these factors combined with the complex geological settings encountered in hydrocarbon exploration make the prediction of the full anisotropic resistivities, especially the orientations of the symmetry axes, difficult using CSEM data alone. It is therefore desirable to have an effective and practical method for inverting CSEM data to a resistivity model that is consistent with a subsurface structure derived from other sources, such as seismic data.

SUMMARY OF THE INVENTION

The present invention requires the acquisition of data at several frequencies spanning a range of skin depths to fully distinguish the structurally-induced anisotropy from intrinsic anisotropy. When confronted with data at multiple frequencies, the inversion algorithm must determine a spatially-varying, but frequency-independent structure that reproduces the data when probed by electromagnetic waves according to the laws of physics as embodied in Maxwell's equations. This structure will most generally be described by intrinsic anisotropies that are correlated to anisotropies derived from seismic or other geophysical information and by structural gradients that are correlated to the gradients of the seismic or other geophysical structure. Preferably, the seismic parameters and their structural gradients are held fixed during the electromagnetic inversion iterations in order to steer the electromagnetic parameters toward values that are consistent with the give seismic structure.

In some of its embodiments, the present invention uses regularization functions, F, based upon low-frequency seismic information and the diffusion equation, to invert electromagnetic geophysical data for resistivity models that match seismically-derived structural models. The seismic earth model is preferably derived at a resolution that is consistent with the resolution of the electromagnetic data which consist of multiple temporal frequencies. The seismic earth model will further suggest appropriate symmetry axes for the resistivity anisotropy and will indicate regions (such as salt or other extrusion features) where the resistivity may be isotropic. Seismic consistency is implemented as an objective of the inversion (instead of as a hard constraint) to allow for uncertainties and errors in the seismic earth model. With this information implemented in the objective function, structural consistency can be maintained during the inversion and anisotropic resistivities can be separated from the effects of geological structure and inhomogeneity, thus providing more reliable subsurface resistivities.

More generally, the regularization function can be based upon a structural model that does not have to be a seismic earth model, but may alternatively be derived from other information, such as geological interpretation, gravity data, outcrop measurements, or basin evolution considerations. The structural model is preferably derived at a resolution that is consistent with the resolution of the electromagnetic data. The structural model will further suggest the appropriate symmetry axes for the resistivity anisotropy and will indicate regions (such as salt or other extrusion features) where the resistivity is expected to be isotropic. The structural consistency is preferably implemented as an objective of the inversion (instead of as a hard constraint) to allow for uncertainties and errors in the structural model and in the electromagnetic data.

In one embodiment, the invention is a method for transforming electromagnetic survey data acquired from a subsurface region to a subsurface resistivity model indicative of hydrocarbon accumulations or lack thereof, said method comprising: (a) obtaining controlled-source electromagnetic or magnetotelluric data from a survey of the subsurface region at a plurality of non-zero frequencies; (b) obtaining geologic or geophysical information about the region, and extracting structure information about the subsurface region from it; (c) assuming an initial resistivity model of the subsurface region; and (d) starting with the initial resistivity model, numerically inverting the electromagnetic survey data, said inversion involving iterative minimization of an objective function and updating of the resistivity model, said objective function including a term measuring mismatch between model synthesized data and measured survey data, and another term being a diffusive regularization term that smoothes the resistivity model based at least partly on the structure information, thereby generating an improved, anisotropic resistivity model of the subsurface region.

Persons who work in the technical field will realize that practical applications of such an invention require that the data inversion be performed on a computer.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which:

FIG. 3 shows a vertical slice in (x,z) plane of the 3-D resistivity model used to generate synthetic data for demonstrating the present invention;

FIG. 4 shows the map view (in (x,y) plane) of electric receivers (inverted triangles) and transmitter towlines (horizontal lines) configuration used to generate the test data;

FIG. 5 shows the model S notionally derived from seismic data or other geophysical data as the a priori structure information;

FIG. 6 shows the starting resistivity model used to invert the synthetic data;

FIG. 7 shows the resistivity model produced by standard electromagnetic inversion using the Laplacian smoothing operator of equation (17) as the regularization; and FIG. 8 shows the inverted resistivity model generated using a seismic structure based on FIG. 5 for the regularization as in equation (8) in accordance with the present invention.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Inversion with Structure Constraint

Figure 1:
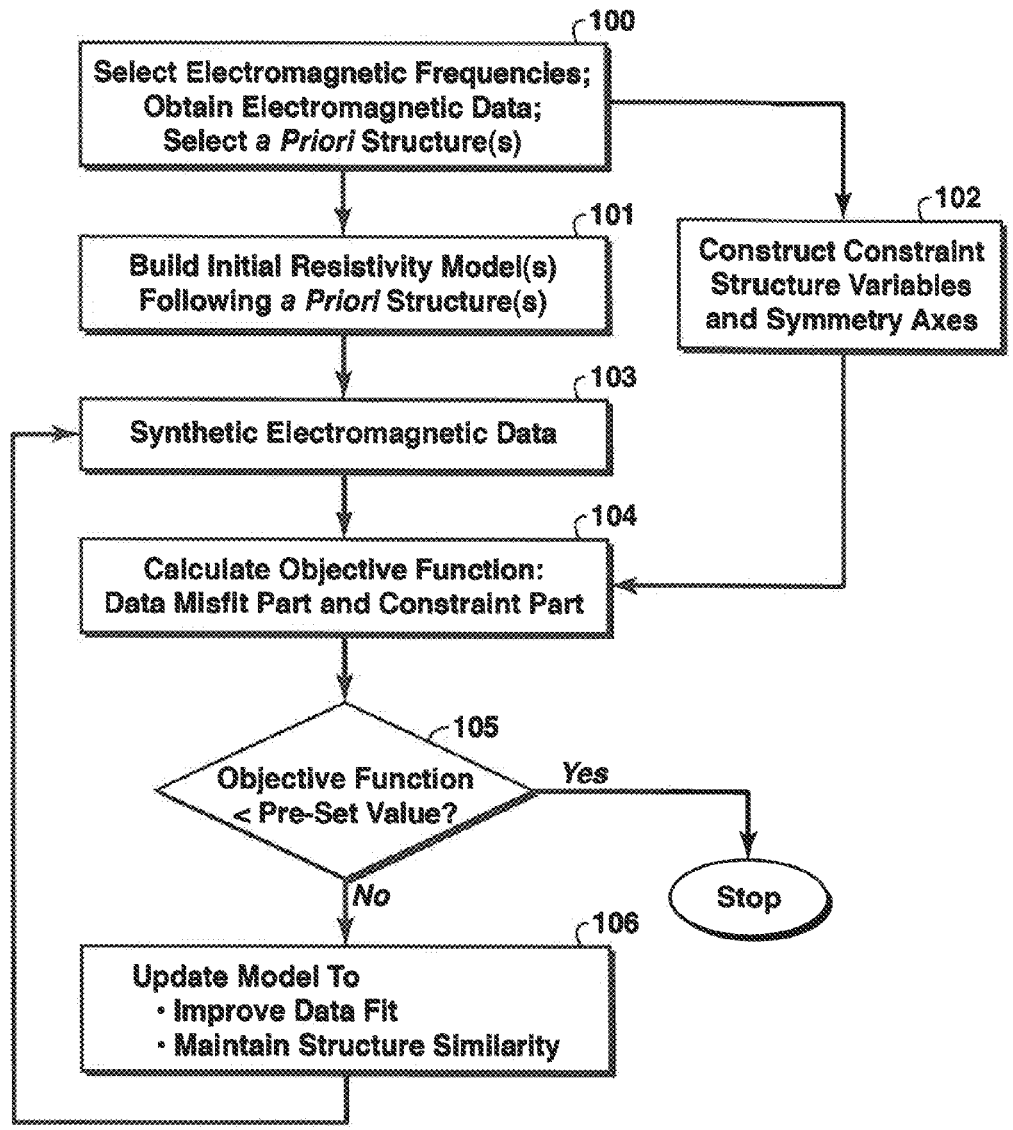
FIG. 1 is a flow chart showing an iterative inversion process for CSEM data with a priori structure constraints using one embodiment of the present invention.

Basic steps in one embodiment of the present invention are shown in the flow chart of FIG. 1. In this embodiment, the a priori structure information is injected as regularization in the objective function of the inversion to encourage the resistivity model to follow the a priori structure and honor any other a priori geological and geophysical constraints.

In step 100, electromagnetic data are obtained. A minimum of two frequencies and preferably six frequencies will be chosen to span the range from 0.1 Hz to 2.0 Hz More generally, frequencies may be chosen to span the range 0.005 Hz to 10 Hz following the methods of U.S. Pat. No. 7,539,279, "Logarithmic Spectrum Transmitter Waveform for Controlled-Source Electromagnetic Surveying," to Lu and Srnka; or Hornbostel and Green, "CSEM survey design for successful imaging," Expanded Abstracts of the 27th Annual International Meeting, Society of Exploration Geophysicists, pp. 682-686 (2008). In step 101, the initial resistivity model (isotropic or anisotropic) is built. The initial resistivity model preferably follows a priori structures.

In step 102, a priori structure information is selected from available geophysical data or geology interpretations to be used as structure and geology constraints in the inversion of the electromagnetic data. It may include structure field, symmetry axes, known key horizons and/or bodies of known rock type, and any other related subsurface geology and geophysical information. The selected structure information is transformed to structure constraint variables which can be implemented numerically in the inversion process by using computers. Rotation matrixes $R_{struct}$ and $R_{sym}$, and diffusion matrix D, discussed latter in this section, are examples of the structure constraint variables. Detailed explanation and instructions on constructing those variables will be discussed below.

In step 103, the synthetic electromagnetic data are generated using the current resistivity model. Persons who work in the technical field will understand that this means numerically solving (on a suitably programmed computer, or computer system) Maxwell's Equations, and that commercial software products are available to do this if the user does not wish to write his/her own program, such as the EMGeo product available for licensing from E. O. Lawrence Berkeley Laboratory, MS 56A-0120, Berkeley, Calif. 94720 (http://www.lbl.gov/Tech-Transfer/techs/lbnl2265.html). In step 104, the objective function designed for the inversion is calculated. It includes a data misfit part, measuring the mismatch between the measured and synthetic electromagnetic data, and regularization and/or constraints parts. The a priori structure constraint variables constructed in step 102 are used in the calculation of the constraint part in the objective function.

In step 105, the current value of the objective function is compared to a pre-set maximum acceptable value, i.e. a convergence criterion. If the current value of the objective function is less than the pre-set value, or another pre-determined stopping condition is reached, the iterative inversion process is finished. Otherwise, the inversion continues.

In step 106, the resistivity model is updated to reduce the objective function. This model update normally improves data fit and/or maintains structure similarity between the current resistivity model and the a priori structure. The gradient of the objective function with respect to inversion model parameters is normally calculated also in this step for updating the resistivity model because, as persons who work in the technical field know, this information enables more rapid convergence and is typically utilized in automated inversion programs. The inversion process returns to step 103 and iterates steps 103 through 106 until the objective function criterion is met. The several trade-off parameters, $\lambda_i$, are reduced as needed in steps 105 or 106 to ensure that the data misfit continues to decrease.

Following next are details on the selection and construction of constraints using a priori information, including structure, symmetry axes, rock property anisotropy, and other subsurface geological and geophysical information, and how the information is incorporated in regularizations of the electromagnetic data inversion are described.

In one preferred embodiment, the function F in equation (1) takes the form $$F(\vec{m}) = (R_{struct}^T \cdot D \cdot R_{struct}) \cdot (\nabla \vec{m}), \quad (8)$$

where D is the diffusion matrix in a principle axis system. D is a diagonal matrix containing diffusion (or smoothing) coefficients along the three principle curvature directions of another constraint field S. The diffusion matrix in the Cartesian system (x,y,z) is the term in parentheses, $$\hat{D} = R_{struct}^T \cdot D \cdot R_{struct} \quad (9)$$

The additional field, S, can be the seismic velocity, seismic reflectivity image, or any other structural information characterizing the subsurface geology. $R_{struct}$ is the rotation matrix from the principle-axis system defined by S to the Cartesian system (x,y,z) used for inversion. The $R_{struct}$ matrix may vary from point to point depending upon the spatial variation of S. The three diagonal elements of D can also be allowed to vary in space by using a priori information to modulate the variation of the conductivity along each of the three directions. The regularization term corresponding to the structure constraint in the objective function of equation (1) becomes, $$\frac{1}{2}\lambda F^T(\vec{m})F(\vec{m}) = \frac{\lambda}{2}(\nabla \vec{m})^T(R_{struct}^T \cdot D^2 \cdot R_{struct})(\nabla \vec{m}) \quad (10)$$

The gradient of the regularization term in the objective function with respect to model parameters $\vec{m}$, which is similar to the operator in a diffusion equation, becomes, $$\frac{\partial}{\partial \vec{m}}\left\{\frac{1}{2}\lambda F^T(\vec{m})F(\vec{m})\right\} = \lambda \nabla \cdot [(R_{stuct}^T \cdot D^2 \cdot R_{struct})\nabla \vec{m}]. \quad (11)$$

This model gradient is used together with the gradient of the data mismatch term in equation (1) to calculate the model update in the iterative inversion process in FIG. 1. This gradient calculation can be implemented on a computer.

The a priori structure information can also be applied to non-linear regularizations, such as the regularization of equation (4) (Portniaguine, 1999; Blaschek, 2009). This can be achieved by replacing $\nabla \vec{m}$ in equation (4) by $\hat{D}\nabla \vec{m}$, which becomes, $$F^T(\vec{m})F(\vec{m}) = \frac{(\hat{D}\nabla \vec{m})^T(\hat{D}\nabla \vec{m})}{(\hat{D}\nabla \vec{m})^T(\hat{D}\nabla \vec{m}) + \beta^2} \quad (12)$$

The gradient of this regularization term with respect to model parameter $\vec{m}$, is $$\frac{\partial}{\partial \vec{m}}\{F^T(\vec{m})F(\vec{m})\} = -\nabla \cdot \left\{\frac{2\beta^2(\hat{D}^T\hat{D}\nabla \vec{m})}{\left[(\hat{D}\nabla \vec{m})^T(\hat{D}\nabla \vec{m}) + \beta^2\right]^2}\right\} \quad (13)$$

These regularization functions can be further generalized to include anisotropy. For example, S can comprise the two seismic velocities associated with a transversely isotropic model having a tilted symmetry axis (TTI), while $\vec{m}$ is extended to include two principle conductivities along the axes defined by the seismic anisotropy. The structure derived from the transverse seismic velocity will be used to constrain the conductivity along the transverse direction, and the structure derived from the seismic velocity along the symmetry axis direction will be used to constrain the conductivity along the symmetry axis direction.

In a more general case, the symmetry axes for elastic wave propagation may differ from the structural variation described by S. In that situation, an additional rotation matrix, $R_{sym}$, may be introduced that specifies the rotation from the elastic principle symmetry axis system to the Cartesian (x,y,z) system for calculation. It further may be assumed that the principle symmetry axes for electrical anisotropy coincide with the axes of elastic symmetry. The rotation matrix $R_{sym}$ could be derived from seismic data or other sources and used as the orientations of the rock electrical property symmetry axes. Thus, at each point, r, in the subsurface, there will be three principle conductivities ($m_r^1$, $m_r^2$, $m_r^3$). The conductivity matrix used in Maxwell's equations in the (x,y,z) coordinate system is given by $$\sigma = R_{sym}^T \cdot M \cdot R_{sym} \quad (14)$$

where M is a diagonal matrix with diagonal elements ($m_r^1$, $m_r^2$, $m_r^3$). Each of the three principle conductivities can be regularized spatially by its corresponding constraint structure as in equation (10).

The rotation matrix $R_{sym}$ that describes the symmetry properties of seismic wave propagation will generally differ from the rotation matrix $R_{struct}$ that describes, for example, the spatial variation of seismic velocity or some other subsurface feature. However, the two matrices may be set equal in some practical applications. In such implementations, the principle-axis directions of both the regularization function in equations (8) and (12) and the anisotropic conductivity in equation (14) are assumed to follow sediment bedding planes. This corresponds to the TTI case with the symmetry axis along the normal direction of the subsurface bedding plane. In this situation, the conductivities along the directions parallel and perpendicular to bedding will be encouraged to track each other and to follow the same structure constraints embodied in $R_{struct}$.

With the inclusion of a priori information on the subsurface structure in the inversion, the inverted anisotropic resistivities will be less impacted by structurally-induced anisotropy and therefore closer to the intrinsic resistivities of the rocks. Structurally-induced anisotropy refers to the phenomenon in which a pattern of isotropic materials will be seen as anisotropic by a survey that probes the pattern at much longer distance scales or wavelengths larger than the pattern. Removing the structural overprint on anisotropy will render the inverted anisotropic resistivities more accurate and thereby enhance the interpretability of the final resistivity models.

Figure 2:
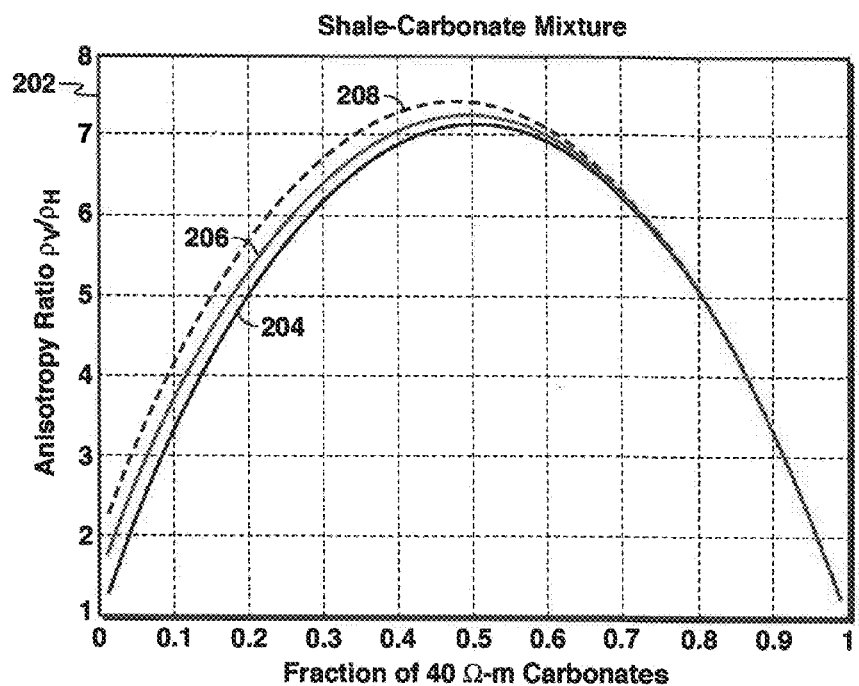
FIG. 2 shows the effective electrical anisotropy in a layered mixture of carbonate and shale.

By way of example, FIG. 2 describes the impact on structural anisotropy when two rock types are interleaved with differing volume fractions. Plot 202 shows the structural resistivity anisotropy of the mixture versus the volume fraction of one of the materials, in this case a 40 Ω-m carbonate with no intrinsic anisotropy. Three cases are shown, corresponding to interleaving an isotropic, 1.5 Ω-m shale (204), an anisotropic shale with $\rho_H$=1.5 Ω-m and $\rho_V/\rho_H$=1.5 (206), and an anisotropic shale with $\rho_H$=1.5 Ω-m and $\rho_V/\rho_H$=2.0 (208). At a high volume fraction of carbonates, all three curves approach 1.0, corresponding to the identical horizontal and vertical resistivities of the carbonate. At the opposite extreme of almost no carbonate, the anisotropies of each case approach their shale values. At intermediate volume fractions, the structural anisotropy is exaggerated over the values of the individual components, reaching a maximum of about 7.5 at about 47% carbonate.

With the inclusion of a priori information on anisotropy symmetry axis orientations themselves instead of the spatial gradient of the orientations, the anisotropy symmetry axe orientations are well constrained and the inverted resistivity structures themselves will be more reliable. Again, because of the exponential decay of the fields with depth, the low frequencies, and limited data coverage present in CSEM data, the anisotropy symmetry axes may not be well defined by the CSEM data alone. Even though the directions of symmetry axes (defining $R_{sym}$) may be included among the model parameters to be inverted as unknown parameters, information about the range of those angles and their spatial variations derived from other data types serves to place bounds and structural constraints on those angles in the CSEM inversions.

The regularization functions as defined in equations (8) and (12) are designed to use geological and/or seismic a priori information in a very direct and natural fashion. The a priori structure information is included in the inversion through the rotation matrix, $R_{struct}$. Other a priori information can be included in the inversion by allowing D to vary throughout the subsurface.

For most practical applications, the diffusion or smoothing within the structure contour surface or within the subsurface bedding can be set to be isotropic, $D_{1,1}$=$D_{2,2}$ and to be different from the smoothing along the structure normal direction, $D_{3,3}$. Normally, the diagonal D matrix (or the diffusion matrix in its principle axis system) is set to $$D_{1,1} = D_{2,2} = 1,$$

$$D_{3,3} = \gamma \quad (15)$$

The diffusion matrix in the Cartesian system (x,y,z) becomes, $$\hat{D}_{i,j} = (R_{struct}^T \cdot D \cdot R_{struct})_{i,j} = \delta_{i,j} + (\gamma - 1) n_i n_j, \quad (16)$$

where $\delta_{i,j}$=1, if i=j and $\delta_{i,j}$=0, if i≠j, i, j=1, 2, 3, and $\vec{n}$=($n_1$, $n_2$, $n_3$) is the structure contour normal direction unit vector. The value $\gamma$ in equations (15) and (16) controls the extend of smoothing along the structure normal direction, $\vec{n}$, relative to the smoothing within the structure contour surface. A priori subsurface geological information can also be incorporated in the spatial variation of $\gamma$ with value in the range between 0 and 1. The value of $\gamma$ can be set to one, which corresponds to simple isotropic smoothing, at subsurface locations where the subsurface structural information is ambiguous. Isotropic smoothing is also appropriate within any domain of constant resistivity, for example, within a salt dome. Isotropic smoothing, $\gamma$=1, does not depend on the rotation matrix $R_{struct}$ from the a priori structure information as shown by equation (16). The a priori structure constraints can be enhanced by increasing the overall weight ($\lambda$) of the regularization term in equation (1) and reducing the $\gamma$ value where the structure information is more reliable.

A special case $\gamma$=0 in equation (15) will make the regularization (8) behave similarly to the cross-gradient constraint. This special case can be applied to locations on known interfaces of big jumps in resistivity across those interfaces. This effectively applies spatial smoothing along the tangential direction of the interfaces and allows jumps across the interfaces.

In addition to the two special cases of $\gamma$=1 and 0, the range for $\gamma$ is normally between 0 and 1 and values in the range 0.01 to 0.10 may be appropriate for most of the locations in a model to allow more rapid variation along the structure normal direction. A person skilled in the art of geophysical inversion may adjust this value to achieve better results and, in particular, may reduce this value further as the inversion converges.

The rotation matrix $R_{struct}$ used for structural constraint can be derived from a wide range of different prior information. Some examples include the seismic velocity, seismic image, and structural interpretation of a seismic image including horizons, faults, salt bodies, and so on. Furthermore, the a priori structural information can be processed to emphasize structural details at length scales that match the CSEM resolution and match any known structures, such as salt bodies which may be constrained as electrically isotropic by setting the three principle conductivities to be the same.

When the seismic imaging velocity field is used as the a priori structure information, the direction vector normal to the velocity field contour (or called the normal direction vector) can be obtained directly from the velocity field, which is used to calculate the diffusion matrix in equation (16). The seismic image velocity field in general contains structure length scale comparable to the CSEM resolution. In general, there is no need to perform spatial smoothing filter to the normal direction vector.

When the a priori structure information is from a seismic image, a spatial smoothing filter is normally required before deriving the normal direction vector of the structure contour surfaces due to the existence of noises in the seismic image. The spatial filtering can be guided by geological structure interpretation. The spatial filter length is roughly in the range of one to five hundred meters, which matches typical CSEM data resolution. In general, a spatial filter length might be chosen to be 50% of the electromagnetic skin depths present in the survey data.

A subsurface geological structure interpretation, consisting of interpreted or suspected boundaries (horizons) between rock strata, may also be used as the a priori structure information. The normal direction vectors between interpreted horizons can be obtained by interpolating the normal direction vectors on those horizons. The normal direction vectors are allowed to be discontinuous across faults.

Multiple types of a priori structural information may be used by including multiple terms like (8) in the objective function.

While term (7) might, at first glance, appear to be equivalent to term (8) after substitution into equation (1), there are some key differences between the method of Saunders et al. and the present invention that are discussed in the following paragraphs. These differences are over and above the use of multiple frequencies, which also is not disclosed in Saunders.

Saunders et al. build up their constraint term from the Hessian of a constraint field, such as the seismic velocity. The Hessian is the matrix of all second derivatives of the field with respect to the coordinate axes and the assumption, therefore, is that the field is smooth enough to be differentiable in all three directions (two directions for a two-dimensional problem). Saunders et al. recognize this problem, but their solution is to place ad hoc limits on the maximum and minimum values in the Hessian matrix and to adjust those limits by hand to obtain pleasing inversion results. By contrast, the present invention utilizes in some embodiments the typical structure characteristic of parallel strata of the subsurface to emphasize determining a normal direction to the structure (equation 16) and permitting the inversion to be minimally constrained in the normal direction. As described above, the normal direction can be determined from fields that are highly discontinuous, such as the interpreted boundaries between seismic strata.

In Saunders et al, the smooth coefficients are taken to be the eigenvalues of the Hessian matrix, which could be highly fluctuating. Even through this provides an automatic way of determining smooth coefficients, it is hard to use this automatically in practical applications as pointed out in the paper. The resistivity may structurally follow the seismic velocity, but the rate of change of the seismic velocity may not necessarily be proportional to the rate of change of the resistivity. In the current invention, available subsurface geological information or an empirical parameter $\gamma$ (in equation (15)) may be used to control the relative smoothing along the structural normal direction relative to the structure contour direction. This allows the resistivity to change at different rate along different directions in a more direct controllable fashion and to use as much geological information as possible by including known geological features in the spatial variation of $\gamma$.

Saunders et al. teach that multiple constraining fields should be built up into one constraint term by effectively forming products of Hessians. In the present invention, it is preferred to add additional, separate terms for each constraint so that the most reliable constraint information is not degraded in subsurface regions where the other constraint information is less reliable.

Saunders et al. teach that the local symmetry directions of the resistivity anisotropy may be uncertain and can therefore be included among the unknown inversion parameters. Saunders et al. further teach that the local symmetry directions of the resistivity will likely follow the resistivity structure itself and they devise a regularization term to enforce this view. While the local symmetry directions of the resistivity may follow the resistivity structure in some instances, the present invention recognizes that this will not always be the case. In particular, the resistivity symmetry axes may be tied to the seismic symmetry axes or to an external seismic structure by means of equations such as (8). Moreover, the present invention recognizes that the externally-specified field will give guidance on those regions where the resistivity may be expected to be isotropic.

Saunders et al. teach that the constraint term (7) should be included in the optimization criterion together with smoothing terms such as (2) or (3). The present invention preferably replaces the smoothing term with the constraint term, as described in the examples below.

A CSEM Example

FIGS. 3 to 8 show electromagnetic inversions of synthetic data comparing the regularization function (8) using a priori information of seismic structure to a more traditional regularization based on a Laplacian smoothing operator, $$F(\vec{m}) = \nabla^2 \vec{m}. \quad (17)$$

This operator in equation (17) corresponds to isotropic smoothing without enforcing any a priori structural information about the subsurface.

Figure 3:
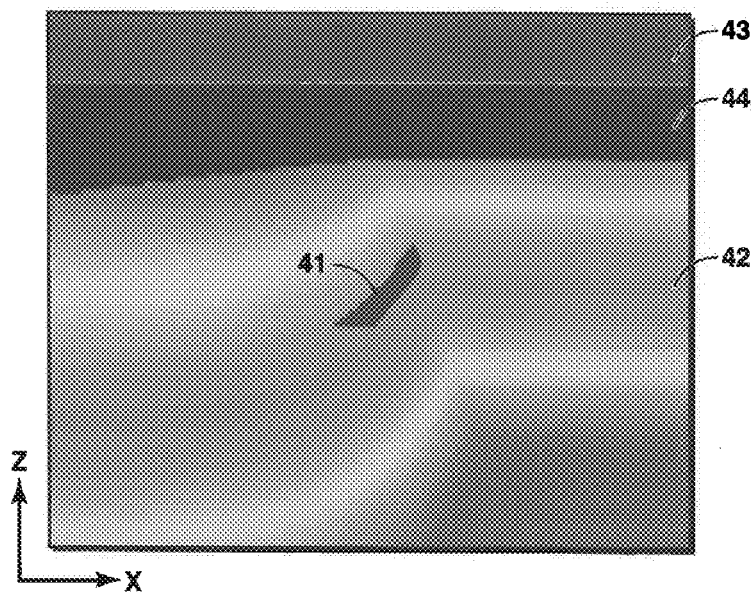
FIGS. 3-8 show an example application of the present invention.

FIG. 3 describes the 3-D resistivity model (a vertical slice in (x,z) plane) used to generate synthetic data for the regularization test. The original version of FIG. 3, as well as FIGS. 5-8, use color to indicate resistivity magnitude. These drawings may be presented herein in a gray scale, depending upon patent law constraints. FIG. 3 shows vertical resistivity. The horizontal resistivity has the same structure and is not shown. The target reservoir 41 is embedded in a thrust sheet 42 dipping downward to the left. The background resistivity does not vary along y-axis direction (perpendicular to the section). However, the reservoir body is finite along the y-axis direction. The top layer 43 is air, and the next layer 44 is water. As an aid to understanding, the vertical scale in this and similar figures has been exaggerated relative to the horizontal scale. The actual horizontal distance depicted is 20 km while the actual vertical distance is 7 km.

Figure 4:
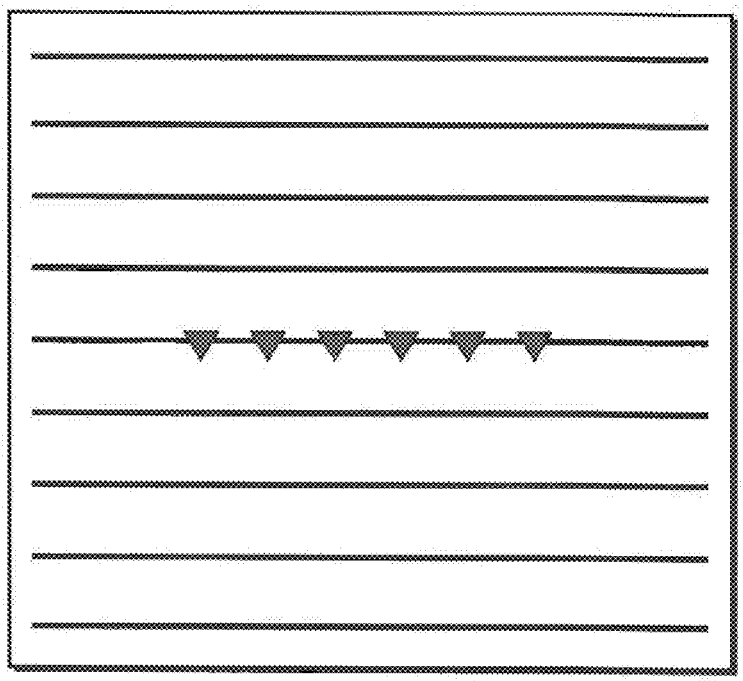

FIG. 4 shows the map view (in the (x,y) plane) of electric receivers (the inverted triangles) and transmitter towlines (the horizontal lines) configured to generate synthetic data using the 3-D resistivity model shown in FIG. 3.

Figure 5:
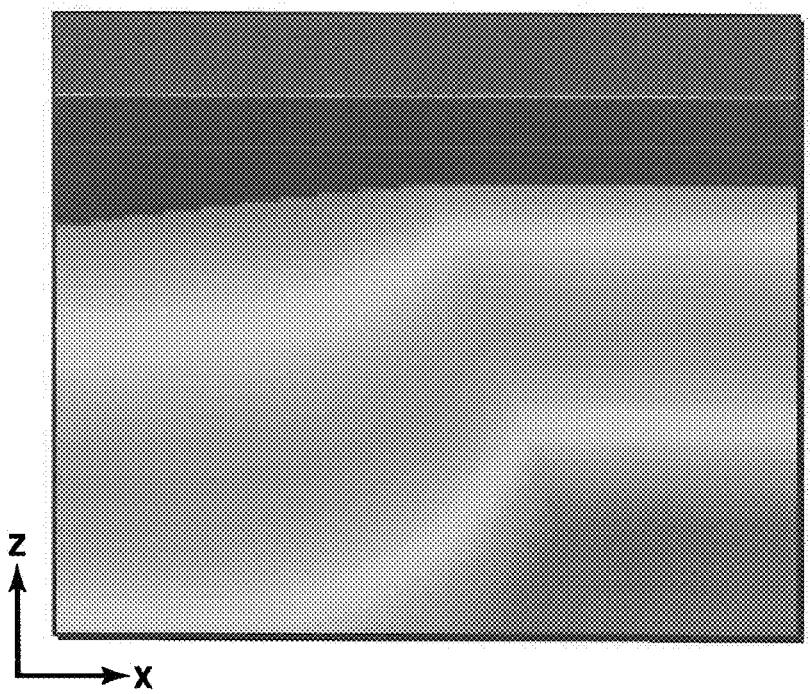

FIG. 5 shows the model S notionally derived from seismic data and used to implement the regularization of equation (8) during inversion of the synthetic data. For purposes of illustration, this model follows the exact background resistivity model without the reservoir 41. The structure normal direction vector $\vec{n}$ is calculated from $\nabla S$, and is used as structure constraint (step 102 of FIG. 1) as in equations (8) and (16).

Figure 6:
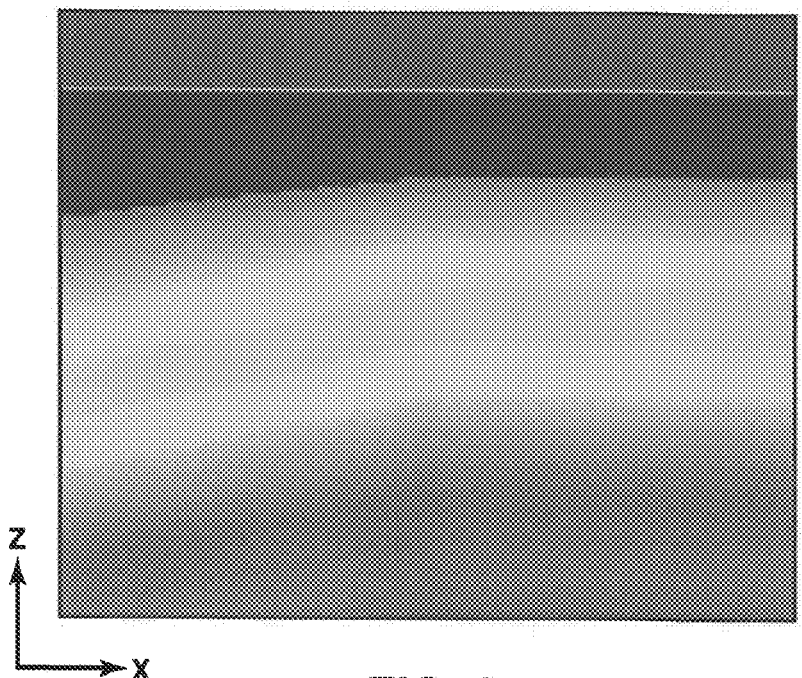

FIG. 6, shows the initial, vertical resistivity model referred to in step 101 and used to invert the synthetic data. The initial horizontal resistivity model is not shown. The general dip direction is included in the initial resistivity model but not the details of the thrust and its hinge. The details of the background notional seismic structure shown in FIG. 5 are used in the inversion as structural regularization to encourage the resistivity update during the electromagnetic data inversion to follow the structure.

Figure 7:
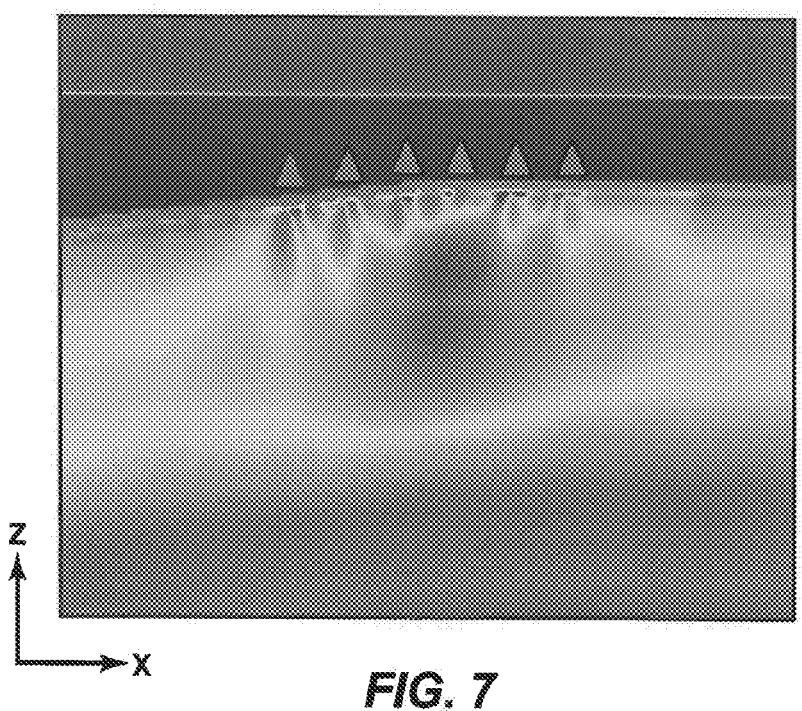

FIG. 7 shows the vertical resistivity model produced by inversion using the standard Laplacian smoothing operator of equation 17 as the regularization. Consistent with the overall scale of the structure, data at four frequencies were used in this synthetic example: 0.125, 0.375, 0.625, and 1.125 Hz. While a resistive anomaly associated with the reservoir in the center has been recovered, strong artifacts appear beneath receivers (triangles) at shallow depths. These artifacts appear where the synthetic data show low sensitivity to model parameters. The details of the thrust and its hinge are not imaged due to the poor resolution in electromagnetic data and the absence of any structural control.

Figure 8:
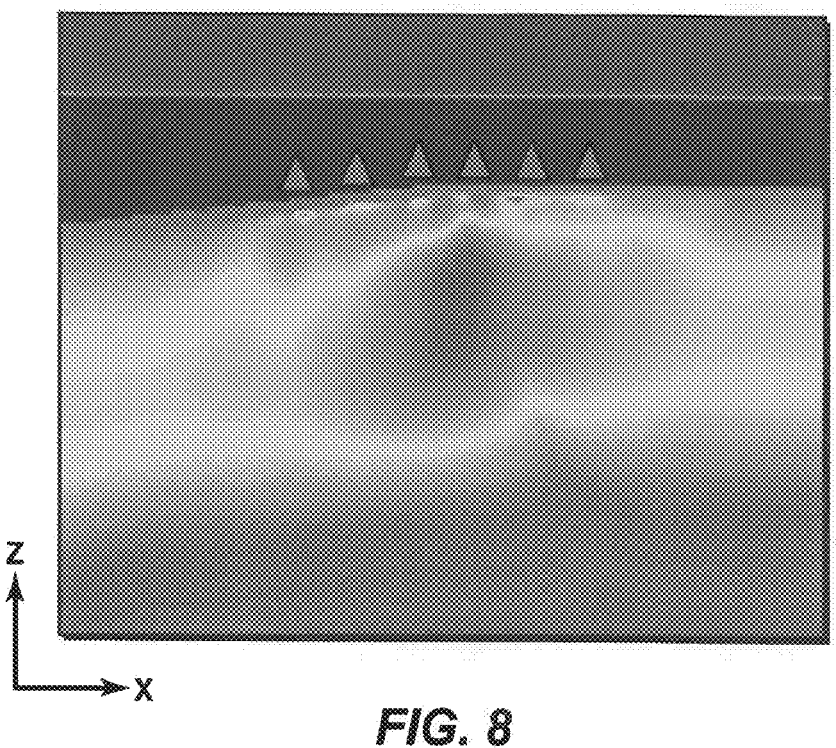

FIG. 8 shows the inverted vertical resistivity model generated using a seismic structure based on FIG. 5 for the regularization as in equation (8). Shallow artifacts beneath the receivers are much weaker than in FIG. 7. The details of the thrust and its hinge in the region covered by receivers are now recovered by the inversion.

The six receivers used in both inversions cover only part of the model at the center. The lack of a model update at both sides in FIGS. 7 and 8 is due to the limited receiver coverage. Because of the low-frequency, diffusive character of electromagnetic waves in the earth and the limited survey aperture, the reservoir shows up in the inverted images as enhanced resistivity in a zone much larger than the actual reservoir size.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Archie, G., 1942, The electrical resistivity log as an aid in determining some reservoir characteristics, Transactions of the AIME, 146, pp. 54-62.

R. Blaschek, A. Hordt, and Kemna, 2008, A new sensitivity-controlled focusing regularization scheme for the inversion of induced polarization data based on the minimum gradient support, Geophysics, 73, pp F45-54.

Carazzone, J. J., O. M. Burtz, K. E. Green, D. A. Pavlov, and C. Xia, 2005, Three Dimensional Imaging of Marine CSEM Data, Expanded Abstracts, 75th Annual International meeting, Society of Exploration Geophsycists, pp. 575-578.

Chen, J. and T. Dickens, 2007, Effects of uncertainty in rock-physics models on reservoir parameter estimation using marine seismic AVA and CSEM data, Abstracts of the 77th Annual International Meeting, Society of Exploration Geophysicists, pp. 457-461.

Commer, M., and G. A. Newman, 2008, New advances in three-dimensional controlled-source electromagnetic inversion, Geophys. J. Int., 172, pp. 513-535.

Constable, S., R. Parker, and C. Constable, 1987, Occam's inversion: a practical algorithm for generating smooth models from electromagnetic sounding data, Geophysics, 52, pp. 289-300.

Ellingsrud, S. T. Eidesmo, S. Johansen, M. C. Sinha, L. M. MacGregor, and S. Constable, 2002, Remote sensing of hydrocarbon layers by seabed logging (SBL): Results from a cruise offshore Angola, The Leading Edge, 21, pp. 972-982

Gallardo, L. A., and M. A. Meju, 2004, Joint two-dimensional DC resistivity and seismic travel time inversion with cross-gradients constraints, Journal of Geophysical Research, 109, B03311.

Gallardo, L. A., M. A. Meju, and M. A. Pérez-Flores, 2005, A quadratic programming approach for joint image reconstruction: mathematical and geophysical examples, Inverse Problems, 21, pp. 435-452.

Herwanger, J. V., C. C. Pain, and C. R. E. de Oliveira, 2002, Electric and Seismic Inversion in Anisotropic Inhomogeneous Media, Fourth International. Conference on Inverse Problems in Engineering, Rio de Janeiro, Brazil.

Hoversten, G. M., F. Cassassuce, E. Gasperikova, G. A. Newman, J. Chen, Y. Rubin, Z, Hou, and D. Vasco, 2006, Direct reservoir parameter estimation using joint inversion of marine seismic AVA and CSEM data, Geophysics, 71, pp. C1-C13.

Hu, W., A. Abubakar, and T. Habasy, 2007, Joint inversion algorithm for electromagnetic and seismic data, Abstracts of the 77th Annual International Meeting, Society of Exploration Geophysicists, San Antonio.

Jupp, D., and K. Vozoff, 1977, Resolving anisotropy in layered media by joint inversion: Geophysical Prospecting, 25, 460-470.

Landa, E., W. Beydoun, and A. Tarantola, 1989, Reference velocity model estimation from prestack waveforms: coherency optimization by simulated annealing, Geophysics, 54, p. 984-990.

A. Lovatini, K. Umbach, and S. Patmore, 3D CSEM inversion in a frontier basin offshore west Greenland, First Break, 27, pp. 95-98, 2009

Lu, X., and C. Xia, 2007, Understanding anisotropy in marine CSEM data: 77th Annual International Meeting, Society of Exploration Geophysicists, Expanded Abstracts, 633-637.

Newman, G. A., and D. L. Alumbaugh, 1997, Three-dimensional massively parallel electromagnetic inversion-I. Theory, Geophys. J. Int. 128, pp. 345-354.

Newman, G. A., and D. L. Alumbaugh, 2000, Three-dimensional magnetotelluric inversion using non-linear conjugate gradients, Geophys. J. Int, 140, pp. 410-424.

Pain, C. C., J. V. Herwanger, J. H. Saunders, M. H. Worthington, and C. R. E. de Oliveira, 2003, Anisotropic Resistivity Inversion, Inverse Problems, 19, pp. 1081-1111.

Portniaguine, O., and M. S. Zhdanov, 1999, Focusing geophysical inversion images, Geophysics 64, pp 874-887.

Saunders, J., J. Herwanger, C. Pain, M. Worthington, and C. de Oliveira, 2005, Constrained resistivity inversion using seismic data, Geophys. J. Int, 160, pp. 785-796.

Srnka, L. J., J. J. Carazzone, M. S. Ephron, and E. A. Eriksen, 2006, Remote reservoir resistivity mapping—an overview, The Leading Edge, 25, pp. 972-975.

Stoffa, P., and M. Sen, 1991, Nonlinear multiparameter optimization using genetic algorithms: Inversion of plane-wave seismograms, Geophysics, 56, pp. 1794-1810.

Symes, W., and J. Carazzone, "Velocity inversion by differential semblance optimization," Geophysics 56, 654-663 (1991).

Xu, S., and R. White, "A new velocity model for clay-sand mixtures," Geophysical Prospecting 43, 91-118 (1995).

The invention claimed is:

1. A computer-implemented method for transforming electromagnetic survey data acquired from a subsurface region to a subsurface resistivity model indicative of hydrocarbon accumulations or lack thereof, said method comprising:

(a) obtaining controlled-source electromagnetic or magnetotelluric data from a survey of the subsurface region at a plurality of non-zero frequencies;

(b) obtaining geologic or geophysical information about the region, and extracting structure information about the subsurface region from it;

(c) assuming an initial resistivity model of the subsurface region; and (d) starting with the initial resistivity model, numerically inverting the electromagnetic survey data, said inversion involving iterative minimization of an objective function and updating of the resistivity model, said objective function including a term measuring mismatch between model synthesized data and measured survey data, and another term being a diffusive regularization term that smoothes the resistivity model based at least partly on the structure information, thereby generating an improved, anisotropic resistivity model of the subsurface region.

2. The method of claim 1, wherein said inversion includes:

(i) using the initial or updated resistivity model to generate synthetic electromagnetic data corresponding to the electromagnetic survey's source and receiver locations and parameters;

(ii) evaluating both terms of the objective function, said mismatch term being a mean square difference between the synthetic and the survey data; and (iii) adjusting the resistivity model to reduce the objective function's numerical value; and (iv) repeating steps (i)-(iii) until the value of the objective function falls below a pre-determined value or other stopping point is reached.

3. The method of claim 1, wherein said other geologic or geophysical information about the region comprises one or more types of a priori subsurface structural or symmetry information selected from a group consisting of seismic velocity, seismic reflectivity, seismic attributes, compressional modulus, shear modulus, density, and a structural interpretation of any such information.

4. The method of claim 1, wherein said initial resistivity model is anisotropic.

5. The method of claim 1, wherein said diffusive regularization term in the objective function may be expressed in the form $$\tfrac{1}{2}\lambda F^T(\vec{m})F(\vec{m})$$

where $\lambda$ is a parameter that controls the relative strength of the data mismatch term and the diffusive regularization term, and F is a function taking the form $$F(\vec{m})=(R_{struct}^T \cdot D \cdot R_{struct}) \cdot (\nabla \vec{m})$$

where D is a diffusion matrix that controls smoothing, expressed in a principle axis system determined by the structure information, where $R_{struct}$ is a rotation matrix from the principle-axis system to a Cartesian system (x,y,z) used for the inversion, and in is a vector whose components are resistivity model parameters.

6. The method of claim 5, wherein the diffusion matrix is an anisotropic diffusion operator.

7. The method of claim 6, wherein D is a diagonal matrix wherein elements corresponding to directions along a structure contour are $D_{1,1}=D_{2,2}=1$ and a third diagonal element corresponding to a direction normal to the structure contour is $D_{3,3}=\gamma$ where $\gamma<1$.

8. The method of claim 7, wherein $\gamma$ is between 0.01 and 0.10, and $\lambda$ is determined such that the diffusive regularization term is between $1/5^{th}$ and $1/100^{th}$ of the data mismatch term in magnitude.

9. The method of claim 7, wherein the values of $\gamma$ and $\lambda$, are reduced as the iteration converges.

10. The method of claim 6, wherein an anisotropic resistivity symmetry axis is determined and is constrained during inversion, said constraint being based on the other geologic or geophysical information about the region.

11. The method of claim 6, wherein a structure axis is determined from said other geologic or geophysical information about the region, and constraints are applied during inversion on the structure axis and the resistive symmetry axis, thereby decoupling structure induced apparent anisotropy from intrinsic anisotropy.

12. The method of claim 1 wherein said plurality of non-zero frequencies are between 0.005 Hz and 10 Hz.

13. The method of claim 12 wherein said plurality of non-zero frequencies are between 0.1 Hz and 2.0 Hz.

14. The method of claim 1, wherein the diffusive regularization term involves a structure, symmetry, or geology constraint determined from said structure information or said other geologic or geophysical information about the region.

15. The method of claim 1, wherein the initial resistivity model of the subsurface region is based at least partly on the structure information about the subsurface region.

* * * * *